United States Patent
Kranzler

(12) 
(10) Patent No.: US 6,396,832 B1
(45) Date of Patent: May 28, 2002

(54) METHOD AND APPARATUS FOR OPTIMIZING A SWITCHED ARBITRATED LOOP FOR MAXIMUM ACCESS FAIRNESS

(75) Inventor: David A Kranzler, Belmont, CA (US)

(73) Assignee: 3COM Corporation, Santa Clara, CA (US)

( * ) Notice: Subject to any disclaimer, the term of this patent is extended or adjusted under 35 U.S.C. 154(b) by 0 days.

(21) Appl. No.: 09/146,781

(22) Filed: Sep. 4, 1998

(51) Int. Cl.[7] .............................................. H04Q 11/04
(52) U.S. Cl. ...................................................... 370/360
(58) Field of Search ................................ 370/452, 461, 370/404–407, 424, 450, 458, 459, 460, 442, 229, 235, 240, 254–257, 222, 223, 224, 457, 455, 453, 447, 449, 451, 401, 403, 351, 276, 296, 389, 465; 340/825.05, 825.5, 825.51, 825.52; 354/135, 139, 113, 147

(56) References Cited

U.S. PATENT DOCUMENTS 6,000,020 A * 12/1999 Chin et al. ................... 370/401
6,192,054 B1 * 2/2001 Chan et al. .................. 370/452

* cited by examiner

*Primary Examiner*—Dang Ton
(74) *Attorney, Agent, or Firm*—Wagner Murabito & Hao LLP

(57) ABSTRACT

In a fiber channel network environment wherein an autonomous hub is provided with a switchable connection to another autonomous hub, an autonomous hub being an arbitrated loop with at least one port, a method is provided for maintaining switchable access between the autonomous hubs while also maintaining access fairness without degrading throughput. The method includes allowing all uncommitted ports to arbitrate together on an integrated hub, while preventing ports on those autonomous hubs which contain a port that has been committed to a loop circuit, from winning arbitration. While the established loop circuits are concurrently exchanging data, arbitration is conducted among the remaining ports which desire access to the integrated hub. Since autonomous hubs containing committed ports are effectively excluded from arbitration, the other ports on those busy hubs cannot win an arbitration and thereby prevent connection of multiple current circuits.

9 Claims, 6 Drawing Sheets

METHOD AND APPARATUS FOR OPTIMIZING A SWITCHED ARBITRATED LOOP FOR MAXIMUM ACCESS FAIRNESS

CROSS REFERENCE TO RELATED APPLICATION

This invention is related to U.S. patent application Ser. No. 09/062,158 filed Apr. 16, 1998 entitled Fibre Channel Arbitrated Loop. The present invention represents an improvement over the invention disclosed therein.

BACKGROUND OF THE INVENTION

This invention relates to fibre channel arbitrated loop network architecture and more particularly to an adaptation of fibre channel architecture to switchable star architectures. The purpose of the invention is to increase the throughput of fibre channel arbitrated loop networks.

Fibre channel networks are a particular class of high-speed networks defined by ANSI Standard X3T11. Fibre channel networks can be constructed in three different topologies: point-to-point, arbitrated loop and fabric switch. Point-to-point networks consist of two stations connected directly to (and only to) each other. Fabric switches can connect networks of up to 16 million stations and provide multiple classes of service (connection-oriented, connection-less with acknowledgement, connection-less without acknowledgement, or intermix).

Referring to FIG. 1, an arbitrated loop topology 10 is shown, which is a shared-bandwidth, logical ring topology designed for low-cost attachment of such stations 12 as servers and disk array devices. Up to 126 stations can communicate on an arbitrated loop 14, but only two stations can communicate interactively at any one time (with an exception for broadcast or multicast conversations). The arbitrated loop standard also allows for a single fabric port 16 to be resident on the loop for connection into the larger network.

In an arbitrated loop topology, stations 12, 16, 18, 20, 22 that intend to communicate on the loop 14 must "arbitrate" for access. Stations signal their intent to arbitrate by issuing a primitive signal for circulation around the loop to all nodes or stations, called an ARB. The ARB is a special ordered set signal which contains the identity of the station that requests access. When multiple stations request access simultaneously, the station with the lowest physical address prevails. (Physical addresses are assigned cooperatively by the stations each and every time the loop topology changes.) A station 12 that wins arbitration then "opens" the station 18 with which it wants to communicate by sending an OPN primitive, which is a special ordered set signal including the address of the target station as an argument. The two stations 12, 18 then communicate in either half-duplex or full-duplex fashion, until both stations agree that the conversation is finished.

Fibre channel arbitrated loops according to the standard may implement access fairness in which all stations connected in an arbitrated loop are presumed to have one chance to win access during any available variable-length "fairness window" or time slot. Once a station has won arbitration during a fairness window (and chooses to obey the access fairness algorithm according to the standard), it will not again arbitrate for access during the same fairness window. According to the standard, this ensures that no station can be deprived its chance to initiate a circuit on an arbitrated loop, since the fairness window remains open so long as the current arbitration winner receives arbitration primitives from another station. The fairness window closes when the current arbitration winner stops receiving arbitration primitives from any other stations on the loop, thus indicating either each station has had an opportunity to initiate a circuit during this fairness window or has no data to transmit.

Arbitrated loops are typically wired together using hub devices 15 in which the loop is formed among the connected stations. A hub device 15 allows multiple stations to be connected together, although only one conversation can take place at any instant in time. This is analogous to networking topologies such as Token Ring (ISO/IEEE 802.5) and Ethernet (ISO/IEEE 802.3).

Referring to FIG. 2, in networking topologies, such as loop networks 14, 114, 214, 314, the conventional prior art approach to increasing the available bandwidth is to provide pass-through switches 24, 26, 28 which allow multiple concurrent conversations to take place. The disadvantage is a need for extra switching logic and buffer memory to support connections. In fibre channel technology it is conventional to use the fabric switch topology when greater bandwidth is needed. However, fabric switches tend to be complex and expensive, particularly given that they must also implement a large number of standardized features, such as address space resolution, and support for multiple classes of service.

Any modification to the arbitrated loop must behave such that devices connected to it are unaware that they are not on a normal loop when they are communicating. This is important for interoperability with any existing fibre channel arbitrated loop hardware on the market.

The prior improvement disclosed in U.S. patent application Ser. No. 09/062,158 over conventional fibre channel arbitrated loop protocols was optimized for throughput and minimal latency to the detriment of access fairness.

What is needed is a mechanism whereby access fairness is maintained without unnecessary degradation to latency and throughput in a fibre channel arbitrated loop.

SUMMARY OF THE INVENTION

According to the invention, in a fibre channel network environment wherein an autonomous hub is provided with a switchable connection to another autonomous hub, an autonomous hub being an arbitrated loop with at least one port, a method is provided for maintaining switchable access between the autonomous hubs while also maintaining access fairness without degrading throughput. The method includes allowing all uncommitted ports to arbitrate together on an integrated hub, while preventing ports on those autonomous hubs which contain a port that has been committed to a loop circuit, from winning arbitration. While the established loop circuits are concurrently exchanging data, arbitration is conducted among the remaining ports which desire access to the integrated hub. Since autonomous hubs containing committed ports are effectively excluded from arbitration, the other ports on those busy hubs cannot win an arbitration and thereby prevent connection of multiple current circuits.

Furthermore, the inventive method includes a mechanism for alerting committed ports that a current fairness window remains open, thus preventing the committed port from initiating a new circuit connection and thus depriving a lower priority station from establishing a circuit.

Still further, a mechanism is provided to alert all autonomous hubs that an uncommitted port on a busy hub wishes to arbitrate for access. This is done by converting the arbitration signal of the uncommitted port to (typically) the second lowest arbitration priority, and then introducing that converted arbitration signal into the arbitration path to be propagated to all autonomous hubs as part of the regular arbitration process. The uncommitted port can then reenter into arbitration using its actual arbitration priority during a current fairness window as soon as the circuit on its hub is terminated and its priority is recognized.

Further refinements include control over detection and signaling of fairness windows, as well as a mechanism for reserving lower arbitration priorities.

A switched arbitrated loop (SAL) according to the invention provides the concurrent bandwidth resource of a fabric switch without the extra features which would increase design cost and operational overhead. In a specific embodiment, a switched arbitrated loop supports 125 nodes for stations (plus one fabric port) in a single loop topology.

The invention provides the concurrent connections and high bandwidth capabilities of a conventional fabric switch, but at a cost close to that of a conventional hub while behaving such that devices connected to it are unaware that they are not on a normal loop when they are communicating.

The invention will be better understood by reference to the following detailed description in connection with the accompanying drawings.

DESCRIPTION OF SPECIFIC EMBODIMENTS

Figure 1:
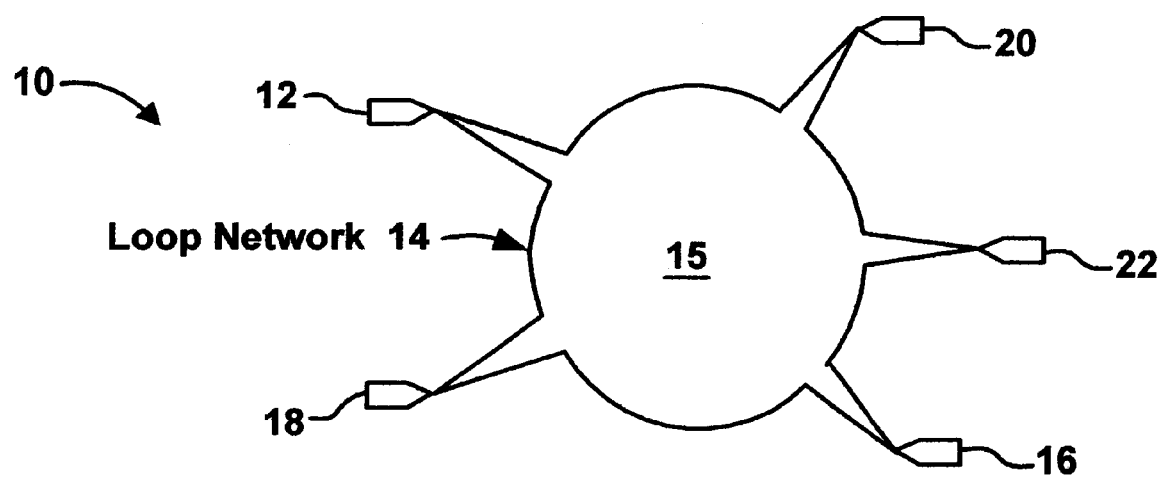
FIG. 1 is a block diagram of a prior art arbitrated loop architecture.
Figure 2:
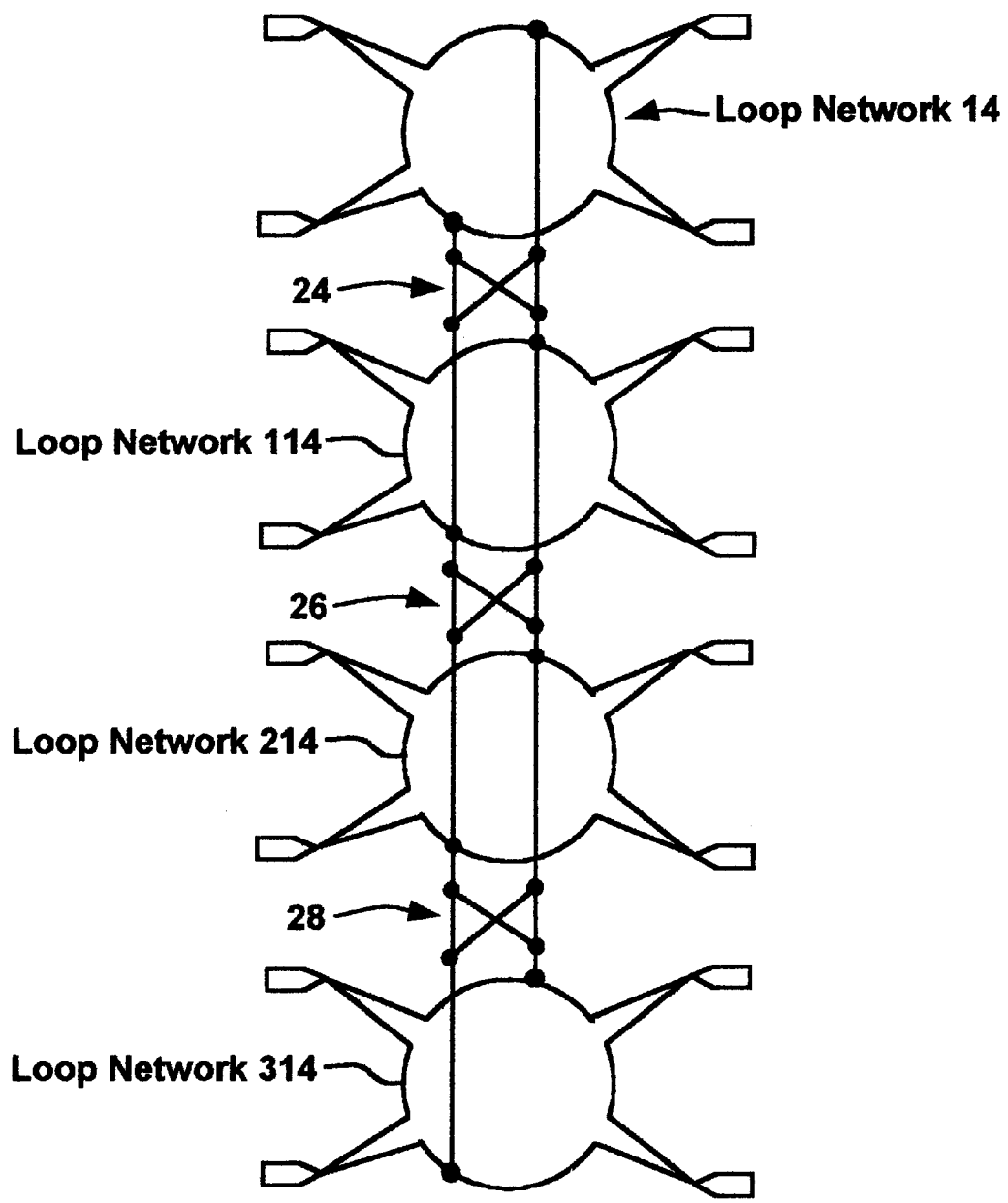
FIG. 2 is a block diagram of a prior art switched hub architecture.
Figure 3:
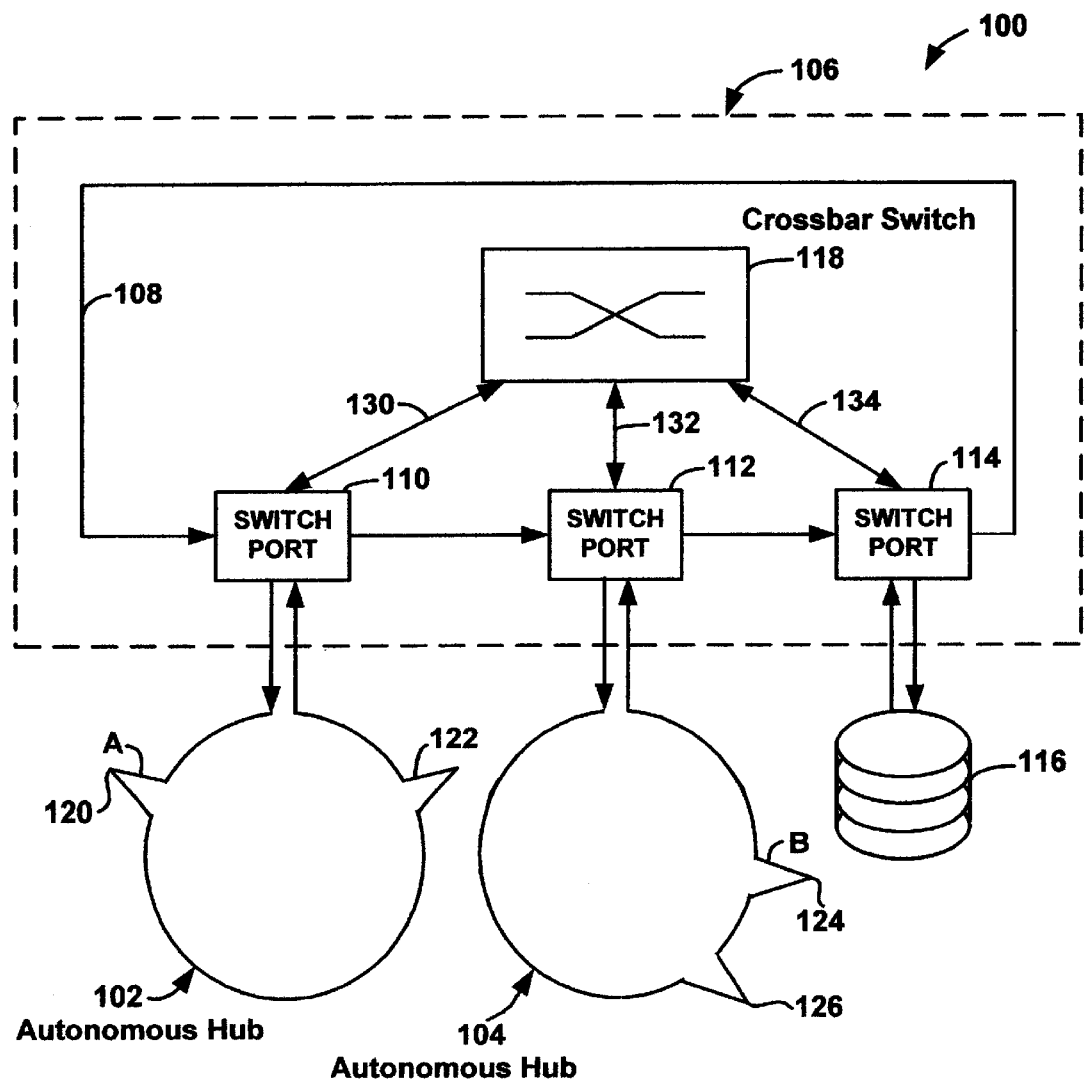
FIG. 3 is a block diagram of an arbitrated loop architecture with autonomous hubs connected by a switched arbitrated loop having a loop-connected control/arbitration path and crossbar-connected data paths according to the invention.

With reference to FIG. 3, an arbitrated loop system 100 with autonomous hubs 102, 104 connected by a switched arbitrated loop 106 is illustrated. The switched arbitrated loop 106 includes a loop-connected control path 108 and switch ports 110, 112, 114 controlling access of the autonomous hubs 102, 104 and such other devices as a hard disk array 116 to a crossbar switch 118 and to the control path 108. The crossbar switch 118 is for establishing direct point to point connections along data paths 130, 132, 134 in loop circuits between pairs of arbitrary ports 120, 122, 124, 126 and 116 (the disk array). The circuits can be either half duplex or full duplex. When priority and arbitration are effected according to the invention, the arbitrated loop system 100 is an integrated hub of all of the autonomous hubs and devices 102, 104, 116.

The arbitrated loop system 100 architecture is topology-specific in that each node 120, 122, 124, 126, 116 in the system 100 is assigned a separate and unique physical address according to an established priority. This invention is particularly suited to high-speed private loops.

Figure 4:
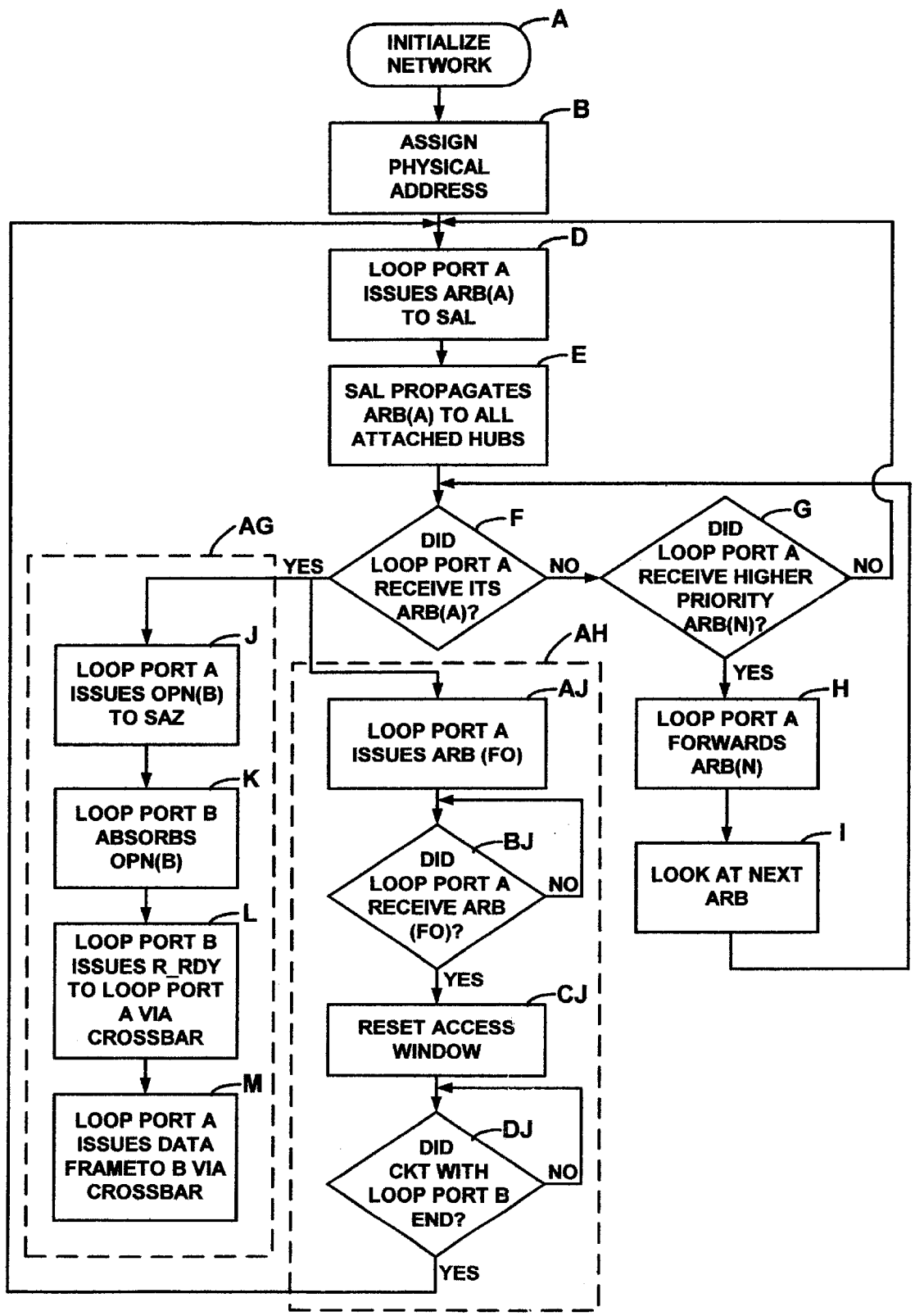
FIG. 4 is a flow chart of the arbitration process according to the invention wherein fairness is taken into account.

In the improved technique according to the invention, and referring to the flow chart of FIG. 4, the network is initialized by forcing all nodes to be coupled as if to a single common or integrated hub (Step A). Then, according to known established protocol, each node adopts or is assigned a specific physical address (Step B).

To establish communication between the first loop port A and the second loop port B through the switched arbitrated loop 106 via the crossbar switch 118, a loop circuit is thereupon established between the first port A and the second loop port B according to the following process:

The first loop port A issues an "arbitrate A" primitive signal (ARB A) via the switched arbitrated loop 106 to the entire integrated hub of the arbitrated loop system 100 via its switch port 110 (Step D), the ARB A primitive signal being a request for access to the entire integrated hub. The ARB A signal is then propagated according to the invention, as hereinafter described, toward all of the loop ports in a contiguous loop via the arbitration path 108 of the switched arbitrated loop 106 and back to the first loop port A (Step E).

The first loop port A then watches for its own ARB A primitive (Step F). If the first loop port A does not receive its own ARB A signal, it looks at the ARB signals testing for higher or lower priority (Step G). It forwards any other higher priority ARB n signal (Step H) and looks at the next ARB signal (Step I) or resends its own ARB A signal (Step D) if a lower priority ARB signal is detected. This process continues until it receives its own ARB A signal (Step F). Receipt of the ARB A signal at its original source, first loop port A, indicates that first loop port A has won the current arbitration. Thereupon the first loop port A pursues two parallel processes: it tests state of an access fairness window (Step AH) and initiates a loop circuit with a second loop port B (Step AG).

Upon receipt of ARB A, while loop port A is engaged in the loop circuit, the system continually tests for the state of the access fairness window. First it issues an ARB F0, or lowest priority arbitration primitive (in accordance with the standard) to the integrated hub (Step AJ) and tests for its receipt via the control path 108 (Step BJ). If yes, it resets its access fairness window as an indication that the fairness window has finally closed (Step CJ), and that loop port A may again arbitrate for access (Step D) after the current loop circuit has terminated (Step DJ).

In the parallel process, loop port A initiates the loop circuit by issuing an "Open B" primitive signal (OPN B) via its attached switched port 110 to the loop port B (Step J). According to the invention it is routed via a path through the crossbar switch 118; the prior art pure hub design would provide for routing through the control path 108 of the switched arbitrated loop 106.

In response to the OPN B, which loop port B absorbs and does not forward (Step K), loop port B issues at least one receive ready primitive signal (RECEIVE READY or R_RDY) via the crossbar 118 according to the invention to the first port A (Step L), thereby establishing the desired circuit. Port A can then issue a data frame via the crossbar 118 to port B according to the invention, as hereinafter explained (Step M).

In parallel with the establishment of the current loop circuit between loop port A and loop port B, the other loop ports attached to the switch may then arbitrate for access by a similar process. Since loop ports A and B are involved in a circuit, they will be able to receive arbitration primitives via the arbitration path, but they will only be able to issue arbitration primitives of specific low-priority types to the arbitration path, as hereinafter explained. This prevents loop ports that are attached to committed switch ports from affecting the arbitration process so long as the circuit remains active.

Figure 5:
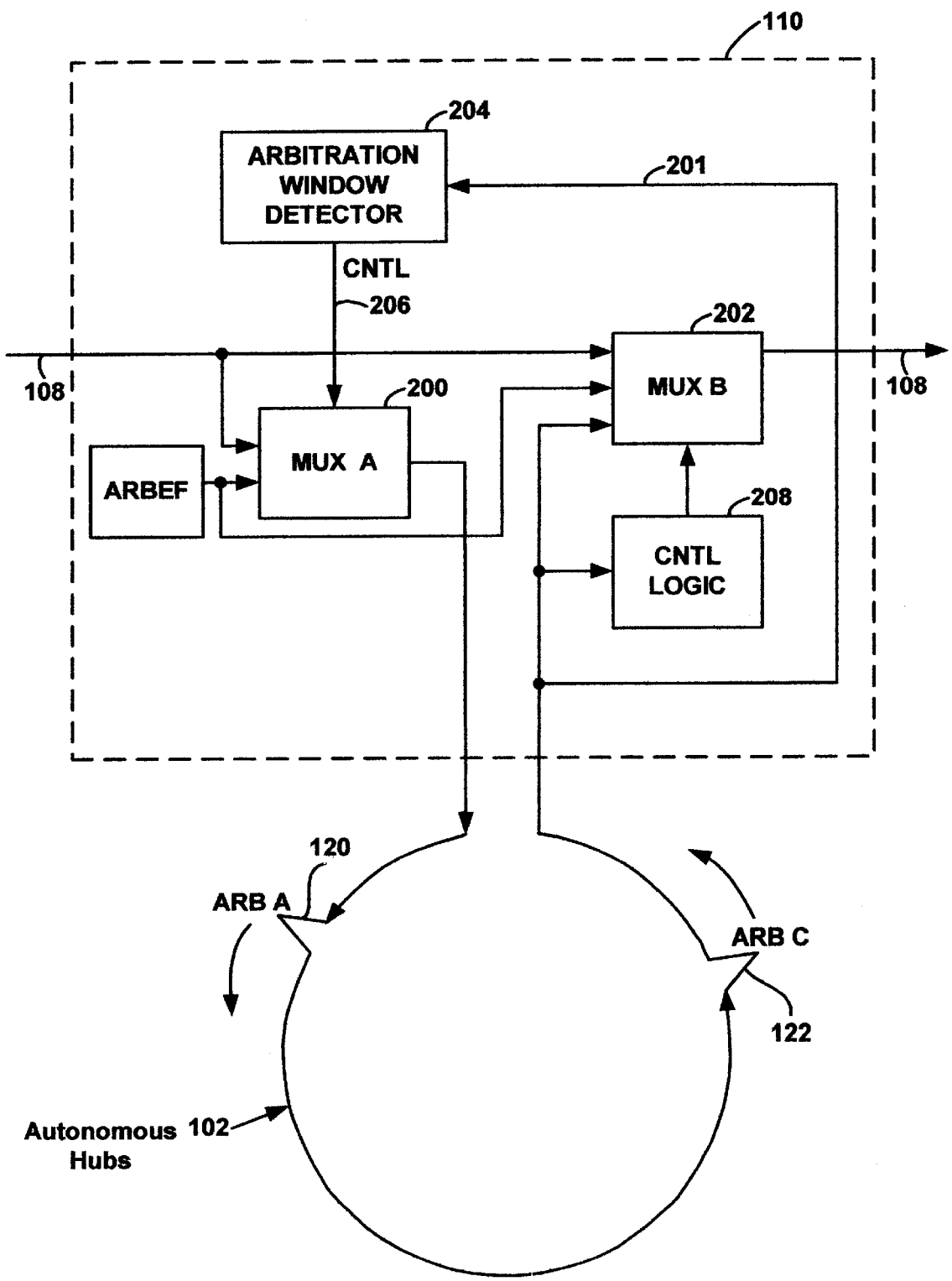
FIG. 5 is a block diagram of a portion of the switched arbitrated loop showing a switch port with arbitration forwarding logic.

FIG. 5 illustrates in a detailed block diagram of a single switch port 110 and one local loop 102 how the presence and absence of arbitration primitives are accurately reflected in the control path 108 of the switched arbitrated loop 106. A switch port 110 comprises an input multiplexer (MUX A) 200 which is a tap in the control path 108, an output multiplexer (MUX B) 202 in the control path, an arbitration window detector 204 and associated logic coupled via a control line 206 to the MUX A 200, and control logic 208 associated with MUX B 202 and which monitors the state of the local loop 102. MUX A 200 receives two inputs, one the ARB n signal on path 108 and one a constant, denoted ARB EF, the selection being under control of detector 204, which monitors the ARB states on loop 102 via line 201. MUX B 202 selects among ARB EF, ARB n on path 108 and ARB A or ARB C on the loop 102 under control of control logic 208, as hereinafter explained.

One of the purposes of the switch port 110 is to alert other connected devices 116, 124, 126 (FIG. 3) that a port 120 on the local autonomous hub 102 wishes to arbitrate for access to the switched arbitrated loop 100 as an integrated hub. A second purpose is to alert the local loop ports 120, 122 on local autonomous hub 102 that a port outside the local autonomous hub 102 wishes to arbitrate for access to the switched arbitrated loop integrated hub 100.

First, the switch port 110 must alert all the other switch ports 112, 114 of the state of the access fairness window. The logical functions embedded in the control logic 208 and arbitration window detector 204 by which this is accomplished are as follows:

1) If the local autonomous hub 102 is not committed to a loop circuit, arbitration primitives received from the upstream neighbor switch port 114 are circulated to the local autonomous hub 102, and the primitives received from the local autonomous hub 102 are forwarded to the downstream neighbor switch port 112.

2) If the local autonomous hub 102 is committed to a loop circuit (because loop port A 120 has established a circuit with a second loop port B 124), and there are no loop ports attached to the local autonomous hub 102 that wish to arbitrate for access, then the switch port 110 forwards any arbitration primitives received from its upstream neighbor switch port 114 directly to its downstream neighbor switch port 112, via the arbitration path 108, thus effectively bypassing the local autonomous hub 102.

3) If the local autonomous hub 102 is committed to a loop circuit, and loop port C 122 wishes to arbitrate for access to the integrated hub, the Mux B 202 in switch port 110 forwards a low-priority primitive signal (typically ARB EF) to the downstream neighbor switch port 112 via the MUX B 202 in control path 108. This low-priority primitive signal alerts the attached autonomous hub 104 and disk drive 116 (FIG. 3) that the access fairness window is still open (because there is a port which still wishes to arbitrate for access). This process may be viewed as spoofing the normal arbitration primitive with a low priority primitive. However, if for example the disk 116 wishes to arbitrate, it successfully gains access to the integrated hub because it has higher priority than the ARB EF signal generated at switch port 110.

Second, the loop ports 120, 122 on the local loop 102 must be aware that loop ports on other autonomous hubs are arbitrating for access. As there may be multiple circuits in progress that are present in the system at the same time, there also may be multiple arbitration winners present in the system at the same time. A mechanism is needed to ensure that arbitration winners do not prematurely detect the closing of the access fairness window. This is accomplished by forwarding either the ARB n primitive received from the path 108 or ta low priority primitive signal (typically ARB EF) to the local loop 102 by means of input multiplexer A 200 in the switch port 110.

The ARB n primitive is forwarded unmodified to the local loop 102 unless all of the following conditions are met:

1) the ARB n primitive received from the upstream switch port 114 by means of the arbitration path 108 is an ARB F0, indicating that none of the loop ports attached to switch port 114 (i.e. the disk array 116) wishes to arbitrate, and 2) there is some autonomous hub somewhere in the system 100 that is sourcing an ARB n (i.e., not ARB F0) to its attached switch port, indicating that at least one of its attached loop ports wishes to arbitrate, and 3) there is a communication circuit in progress connected through switch port 110, indicating that one of the loop ports attached to the local autonomous hub 102 may have won arbitration already.

If all of these conditions are met, the switch port 110 forwards a low-priority arbitration primitive signal (typically ARB EF) to the attached autonomous hub 102. This alerts an attached loop port that has already won arbitration that the fairness window is still open.

Figure 6:
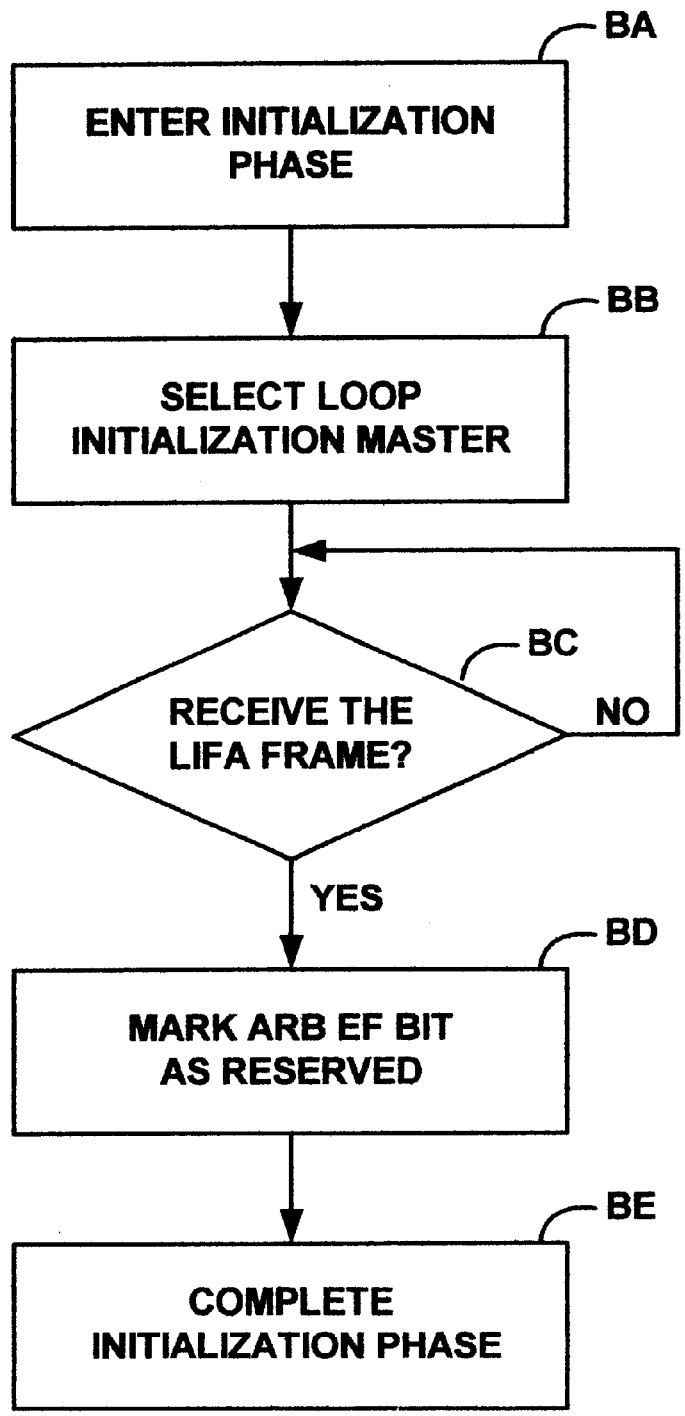
FIG. 6 is a flow chart of a technique used in reserving the second lowest priority physical address as part of the initiation phase.

This invention is also a means to reserve low-priority physical addresses (typically EF=1110 1111, the second lowest physical address) for use in signalling the state of the access fairness window. This is accomplished during the initialization phase (Step A of FIG. 4). The switch port 110 marks the desired physical address as reserved while the loop initialization address frames (typically the LIFA (Loop Initialization Fabric Address), LIPA (Loop Initialization Previous Address) LIHA (Loop Initialization Hard Address), and LISA (Loop Initialization Soft Address) frames are circulating, as described by the FC-AL spec in the section regarding physical address assignment. More specifically, in reserving the second-lowest priority physical address, referring to FIG. 6, the initiation phase is entered (Step BA) and then the loop initiation master is selected (Step BB) and is tested until the LIFA frame has been received Step BC). Once it is received, the ARB EF bit is marked as reserved (Step BD) whereupon the initiation phase is continued until completed (Step BE).

A further feature of the invention is the ability to support full-duplex communication between loop ports A and B, to achieve greater bandwidth and lower latency. This is a straightforward modification of the process illustrated in FIG. 4. Loop port A signals its intention to open a full-duplex communication path with loop port B by sending an OPN AB primitive signal (instead of the half-duplex OPN B primitive signal). Loop port A indicates its ability to absorb frames from loop port B by sending a series of one or more R_RDY primitive signals following the OPN AB primitive signal. The SAL 106 then must absorb and regenerate these R_RDY primitive signals to loop port B following the retransmission of the OPN AB primitive signal to loop port B.

What has been explained is a logical loop arbitration protocol. However, implementation of the logical loop need not be limited to a physical loop. A bus, a mesh, a star or a crossbar switch structure could be configured to carry out the arbitration function as if in a logical loop. Implementation in any such physical configuration of the logical loop is within the capability of one of ordinary skill in the art. The data circuit is assumed to be implementable in a switching matrix of N by N in which N/2 or fewer connections can be established simultaneously. Similarly, the implementation is within the capability of one of ordinary skill in the art.

The invention has now been explained with reference to specific embodiments. Other embodiments will be apparent to those of ordinary skill in the art. It is therefore not intended that this invention be limited, except as indicated by the appended claims.

What is claimed is:

1. An improvement in a method operative in a network employing a fibre channel arbitrated loop protocol having flow control credit management and a topology-dependent physical address for each loop port, the method providing communication of data and control between a first loop port A and a second loop port B through a switched arbitrated loop containing a plurality of autonomous logical hubs and a logical crossbar switch, each of said autonomous logical hubs comprising at least one loop port and attaching to the switched arbitrated loop via an associated switch port, the method comprising issuing at any loop port a loop initialization protocol (LIP) primitive sequence in order to cause all loop ports to initialize around an integrated logical hub; and thereafter prioritizing each loop port on the switched arbitrated loop by its physical address on the integrated hub, thereafter arbitrating during a current fairness window between said loop ports on said integrated hub to determine an arbitration winner; the improvement comprising: thereupon establishing a first logical circuit for data exchange between said first loop port A and said second loop port B through said logical crossbar switch under access control via the integrated hub through a first switch port; thereupon excluding from said arbitrating an autonomous hub containing said first loop port A and an autonomous hub containing said second loop port B for the duration of said first logical circuit through said first switch port; and thereafter further arbitrating during said current fairness window in order to establish further logical circuits concurrent with said first logical circuit.

2. The method according to claim 1 wherein said excluding step comprises forwarding arbitration primitives received at a first input of said first switch port to a first output of said first switch port which in turn is coupled to a second input of a second switch port, said forwarding occurring while said first switch port supports said first circuit of the first logical loop port A associated with said switch port.

3. The method according to claim 1, wherein a third loop port C which is attached to a switch port and is requesting access to said integrated hub during duration of a logical circuit involving said switch port, the further step of:

introducing via said first switch port, as a substitute for a first arbitration primitive associated with said third loop port C, a low priority arbitration primitive from a first output of said first switch port to a second input of said second switch port as a part of an alert to all loop ports that said fairness window remains open.

4. The method according to claim 3 wherein said low priority arbitration primitive is a global primitive of second lowest priority.

5. The method according to claim 1 further including grabbing an address assignment frame and marking a physical loop port address as reserved for use by the switched arbitrated loop in order allow the switched arbitrated loop to issue an arbitration primitive associated with said physical address.

6. The method according to claim 1 wherein said arbitrating step further comprises forwarding arbitration primitives received at a first input of said first switch port to an attached logical loop active in a logical circuit in order to alert all loop ports of said attached logical loop that said fairness window is still open.

7. The method according to claim 6 wherein said arbitrating step further comprises substituting a higher priority arbitration primitive in place of a substantially lower priority arbitration primitive received at a first input of said first switch port; thereupon forwarding said higher priority arbitration primitive to said attached logical loop which is active in a logical circuit in order to alert other loop ports of said attached logical loop that said fairness window is still open.

8. The method according to claim 7 wherein said higher priority arbitration primitive is a global primitive of second lowest priority.

9. The method according to claim 1 wherein said arbitrating step further includes reserving low-priority physical addresses for use in signalling a current state of said fairness window.

* * * * *